(12) United States Patent
Numata

(10) Patent No.: US 10,931,882 B2
(45) Date of Patent: Feb. 23, 2021

(54) IMAGING DEVICE, CONTROL METHOD OF IMAGING DEVICE, AND STORAGE MEDIUM, WITH CONTROLLING OF EXPOSURE LEVELS OF PLURALITY OF IMAGING UNITS

(71) Applicant: CANON KABUSHIKI KAISHA, Tokyo (JP)

(72) Inventor: Aihiko Numata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 16/167,847

(22) Filed: Oct. 23, 2018

(65) Prior Publication Data

US 2019/0132501 A1 May 2, 2019

(30) Foreign Application Priority Data

Oct. 26, 2017 (JP) .............................. JP2017-207353

(51) Int. Cl.
*H04N 5/235* (2006.01)
*G06T 3/40* (2006.01)
*H04N 5/232* (2006.01)

(52) U.S. Cl.
CPC ............ *H04N 5/2353* (2013.01); *G06T 3/40* (2013.01); *G06T 3/4038* (2013.01); *H04N 5/2354* (2013.01); *H04N 5/23212* (2013.01); *H04N 5/23296* (2013.01)

(58) Field of Classification Search
CPC ............ H04N 5/2353; H04N 5/23296; H04N 5/23218; H04N 5/23238; H04N 5/2354; G06T 3/40; G06T 3/4038
See application file for complete search history.

(56) References Cited

U.S. PATENT DOCUMENTS

| 7,259,784 B2* | 8/2007 | Cutler ...................... G06T 5/008 348/223.1 |
| 8,643,768 B2* | 2/2014 | Masuda ............... H04N 5/2258 348/362 |
| 9,589,350 B1* | 3/2017 | Kozko ..................... G06T 5/008 |

(Continued)

FOREIGN PATENT DOCUMENTS

| CN | 107087107 A | 8/2017 |
| CN | 206402330 U | 8/2017 |

(Continued)

OTHER PUBLICATIONS

Jul. 29, 2020 Chinese Official Action in Chinese Patent Appln. No. 201811259859.9.

*Primary Examiner* — Ahmed A Berhan
(74) *Attorney, Agent, or Firm* — Venable LLP

(57) ABSTRACT

A first imaging unit according to the present embodiment has a plurality of imaging units arranged such that capturing ranges partially overlap with each other and generates a combined image in which images captured by the plurality of imaging units are connected and combined to each other by a combining processing unit. A second imaging unit according to the present embodiment captures a part of a capturing range of the first imaging unit. A control unit according to the present embodiment controls exposure levels of the plurality of imaging units based on at least one of a state of the second imaging unit and information included in an image captured by the second imaging unit.

22 Claims, 7 Drawing Sheets

(56) References Cited

U.S. PATENT DOCUMENTS

| | | |
|---|---|---|
| 10,334,209 B2 | 6/2019 | Fu et al. |
| 2015/0296142 A1* | 10/2015 | Cappel-Porter .... H04N 5/23238 348/37 |
| 2017/0178379 A1 | 6/2017 | Fu et al. |
| 2020/0137302 A1 | 4/2020 | Li et al. |

FOREIGN PATENT DOCUMENTS

| | | |
|---|---|---|
| CN | 107295256 A | 10/2017 |
| JP | 2007-006285 A | 1/2007 |

* cited by examiner

FIG. 4

| ITEM | | |
|---|---|---|
| A: AUTOMATIC TRACKING OPERATION INSTRUCTION | NOT YET RECEIVED AUTOMATIC TRACKING INSTRUCTION | ALREADY RECEIVED AUTOMATIC TRACKING INSTRUCTION |
| B: CHANGE IN CAPTURING DIRECTION OF SECOND IMAGING UNIT | CHANGE PER UNIT TIME IS SMALL | CHANGE PER UNIT TIME IS LARGE |
| C: CHANGE IN ZOOM STATE OF SECOND IMAGING UNIT | CHANGE IN VIEW ANGLE PER UNIT TIME IS SMALL | CHANGE IN VIEW ANGLE PER UNIT TIME IS LARGE |
| D: CHANGE IN FOCUS STATE OF SECOND IMAGING UNIT | CHANGE IN FOCUS STATE PER UNIT TIME IS SMALL | CHANGE IN FOCUS STATE PER UNIT TIME IS LARGE |
| E: SUBJECT DETECTION RESULT IN SECOND IMAGING UNIT | PARTICULAR SUBJECT IS NOT DETECTED | PARTICULAR SUBJECT IS DETECTED |
| F: ZOOM STATE OF SECOND IMAGING UNIT | VIEW ANGLE IS WIDE | VIEW ANGLE IS NARROW |
| G: SIZE OF SUBJECT IN DETAIL IMAGE | SIZE IS SMALL | SIZE IS LARGE |
| H: CAPTURING DIRECTION OF SECOND IMAGING UNIT | CLOSE TO DIRECTION OF CONNECTION PORTION BETWEEN PLURALITY OF IMAGING UNITS | FAR FROM DIRECTION OF CONNECTION PORTION BETWEEN PLURALITY OF IMAGING UNITS |
| I: CAPTURING DIRECTION OF SECOND IMAGING UNIT | IMAGING UNIT WHICH CAPTURES DIRECTION FAR FROM CAPTURING DIRECTION OF SECOND IMAGING UNIT | IMAGING UNIT WHICH CAPTURES DIRECTION CLOSE TO CAPTURING DIRECTION OF SECOND IMAGING UNIT |
| | ACQUIRE NATURAL IMAGE WHEN COMBINED | IMPROVE VISIBILITY OF BRIGHT REGION OR DARK REGION |

IMAGING DEVICE, CONTROL METHOD OF IMAGING DEVICE, AND STORAGE MEDIUM, WITH CONTROLLING OF EXPOSURE LEVELS OF PLURALITY OF IMAGING UNITS

BACKGROUND OF THE INVENTION

Field of the Invention

The present invention relates to a technology used for a surveillance camera or the like.

Description of the Related Art

In recent years, imaging devices in which images captured by a plurality of aligned cameras are combined and thereby an image of a capturing range wider than that obtained by using a single camera can be acquired have been proposed (for example, Japanese Patent Application Laid-Open No. 2007-6285).

In an imaging device disclosed in Japanese Patent Application Laid-Open No. 2007-6285, each of the plurality of cameras individually sets an exposure condition. At this time, each of the plurality of cameras detects the brightness of a subject from an image and sets a suitable exposure level. When an auto exposure (AE) process is performed, a difference in signal levels may occur at a seam of combined images resulting in an unnatural, low grade combined image. Further, when a signal level difference is large between the plurality of images to be connected, positioning accuracy in a combining process also decreases, and a phenomenon such as double image or missing of a part of image (occlusion) is likely to occur, which may result in a lower grade combined image.

On the other hand, when the same exposure condition is set to all the plurality of cameras, unnaturalness at the seam of the combined image decreases, and positioning accuracy is improved. However, a large brightness difference between capturing regions taken by respective cameras may result in a low grade combined image with reduced visibility of a subject in a bright region or a dark region.

SUMMARY OF THE INVENTION

An imaging device according to the present invention includes: a first imaging unit that has a plurality of imaging units arranged such that capturing ranges partially overlap with each other and generates a combined image in which images captured by the plurality of imaging units are connected and combined to each other; a second imaging unit that captures a part of a capturing range of the first imaging unit; and a control unit that controls exposure levels of the plurality of imaging units based on at least one of a state of the second imaging unit and information included in an image captured by the second imaging unit.

Further features of the present invention will become apparent from the following description of exemplary embodiments with reference to the attached drawings.

BRIEF DESCRIPTION OF THE DRAWINGS

FIG. 4 is a diagram illustrating a relationship of a state of a second imaging unit, a detail image, and a wide angle image.

DESCRIPTION OF THE EMBODIMENTS

Preferred embodiments of the present invention will now be described in detail in accordance with the accompanying drawings.

General Configuration of Imaging Device of Embodiment

Figure 1A:
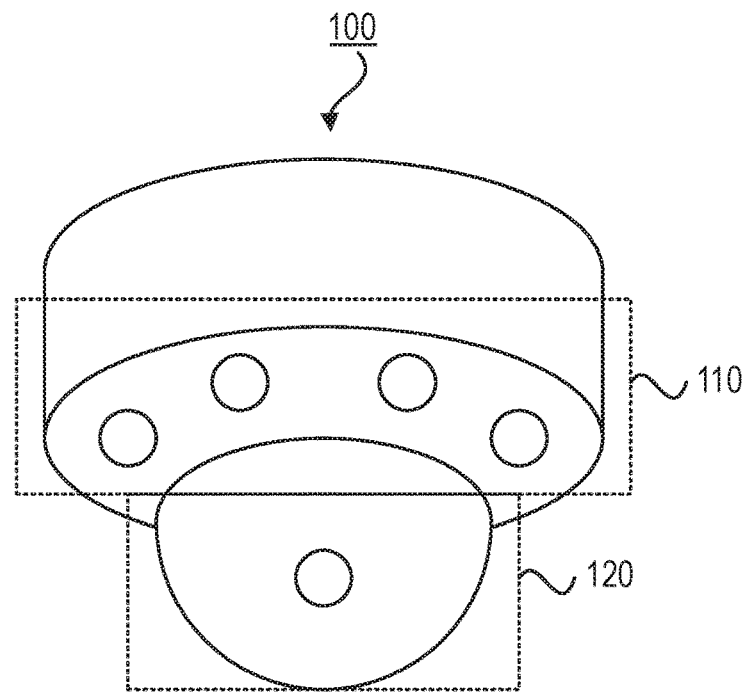
FIG. 1A and FIG. 1B are diagrams illustrating a schematic external appearance and an internal arrangement example of an imaging device of an embodiment.
Figure 1B:
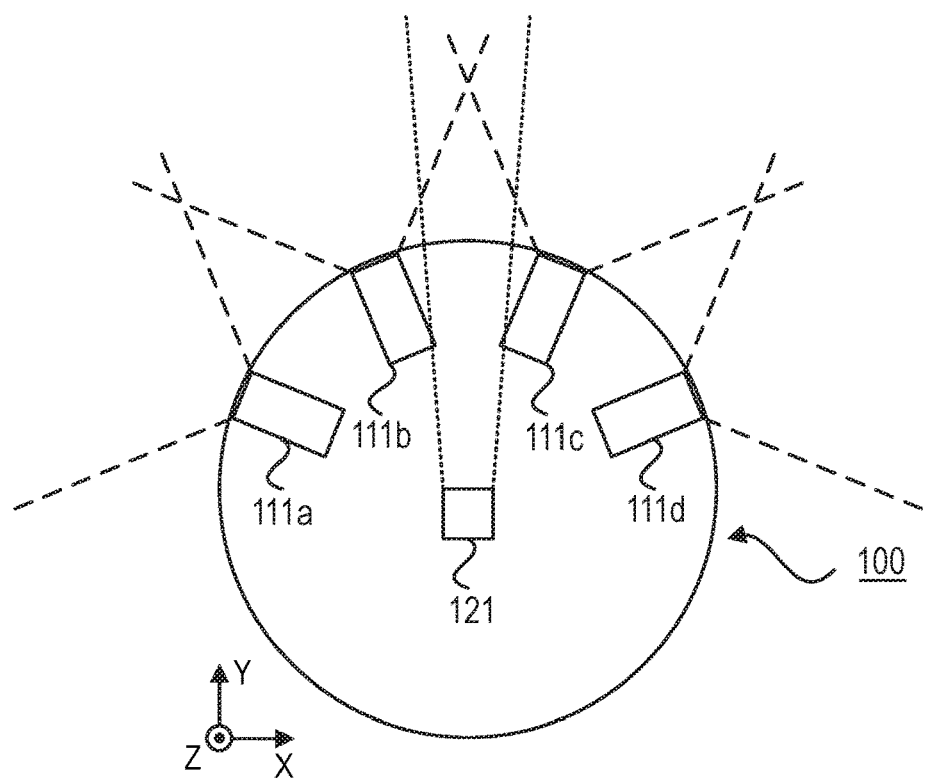
Figure 2:
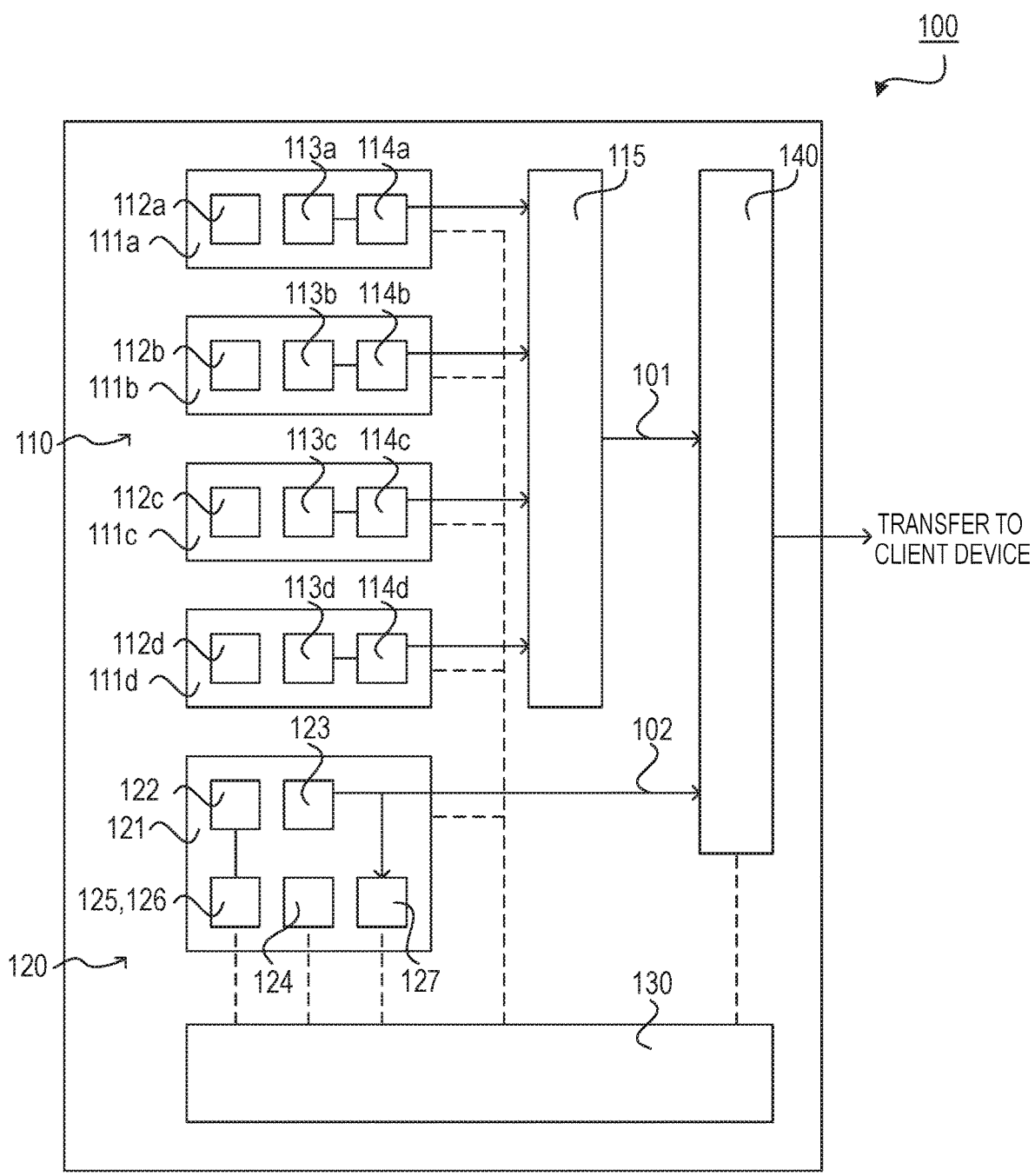
FIG. 2 is a functional block diagram of an imaging device of the embodiment.

FIG. 1A, FIG. 1B, and FIG. 2 are diagrams illustrating a general configuration of an imaging device according to the present embodiment. Note that, in each of the following drawings, the same function as or a portion corresponding to each component of FIG. 1A, FIG. 1B, or FIG. 2 is labeled with the same reference numeral, and the duplicated description thereof will be omitted.

FIG. 1A and FIG. 1B are diagrams illustrating a general configuration example of the imaging device of the present embodiment. FIG. 1A is a perspective view of the imaging device 100 when viewed in an oblique direction, and FIG. 1B is an arrangement diagram of the imaging devices 100 when viewed from the upper side (from the +Z-axis direction). Further, FIG. 2 is a functional block diagram illustrating an internal configuration of the imaging device of the present embodiment.

The imaging device 100 has a first imaging unit 110 that acquires an imaging signal in which a capturing range with a wide view angle is captured (referred to as a wide angle image 101) and a second imaging unit 120 that acquires an imaging signal in which a part of the capturing range of the first imaging unit 110 is captured (referred to as a detail image 102). Further, the imaging device 100 has a control unit 130 that controls operations of the first imaging unit 110 and the second imaging unit 120, a transfer unit 140 that transfers the wide angle image 101 and the detail image 102 to the outside, and the like.

The transfer unit 140 is connected to an external client device via a wired or wireless network and adapted to be able to sequentially transfer the wide angle image 101 and the detail image 102 to the same network by using a switch to select the wide angle image 101 or the detail image 102. The external client device transmits a command that controls the imaging device 100 to the imaging device 100 via the network. The imaging device 100 receives the command by the transfer unit 140 and transmits a response to the command to the client device. The client device is an external device such as a personal computer (PC), and the network is formed of a wired LAN, a wireless LAN, or the like. The imaging device 100 may be configured to be externally powered via the network.

First Imaging Unit: Multiview Wide Angle Camera

The first imaging unit 110 has a plurality of imaging units 111a, 111b, 111c, and 111d arranged such that the capturing ranges thereof partially overlap with each other. The imaging device 100 connects and combines respective images acquired by the imaging units 111a to 111d in a combining process unit 115. A combined image created by the combining process unit 115 is then output as the wide angle image 101 from the first imaging unit 110. Specifically, the combining process unit 115 calculates a correlation coefficient while shifting an overlapping portion of images acquired by the plurality of adjacent imaging units (such as the imaging unit 111a and the imaging unit 111b, for example) and calculates a displacement between the plurality of images by applying a so-called pattern matching technology. The combining process unit 115 then adjusts the positions of the plurality of images in accordance with the displacement, combines the plurality of position-adjusted images so as to connect these images to each other, and thereby generates the wide angle image 101.

The plurality of imaging units 111a to 111d have image-formation optical systems 112a to 112d, solid state image pickup devices 113 to 113d, and light measurement acquisition units 114a to 114d, respectively. The plurality of imaging units 111a to 111d acquire images by forming a subject image on the solid state image pickup devices 113a to 113d via the image-formation optical systems 112a to 112d, respectively. Drive operations of respective solid state image pickup devices 113a to 113d and signal readout operations from respective solid state image pickup devices 113a to 113d are controlled by the control unit 130.

The light measurement acquisition units 114a to 114d use pixel signals read out from the corresponding solid state image pickup devices 113a to 113d and acquire a light measurement that is an averaged signal level of images captured by respective imaging units 111a to 111d. The light measurement acquired by the light measurement acquisition units 114a to 114d is transferred to the control unit 130. The control unit 130 controls the exposure level of each of the imaging units 111a to 111d by controlling charge accumulation time in each pixel of the solid state image pickup devices 113a to 113d based on the transferred light measurement. The details of the exposure level control will be described later.

Second Imaging Unit: Monocular Telephoto Camera

The second imaging unit 120 is formed of a single imaging unit 121 and has an image-formation optical systems 122, a solid state image pickup device 123, a drive mechanism 124 that can change the capturing direction, a zoom mechanism 125 that can change a capturing view angle, and a focus mechanism 126 that can change a focus position. Further, the imaging device 100 has a signal processing unit 127 that detects a particular subject and acquires motion information thereon from the captured image. The signal processing unit 127 detects a particular subject and acquires motion information thereon from the detail image 102 acquired by the second imaging unit 120. Note that the signal processing unit 127 is also able to detect a subject and acquires motion information from the wide angle image 101. In the second imaging unit 120, in the same manner as in the first imaging unit 110, the drive operation of the solid state image pickup device 123 and the signal readout operation from the solid state image pickup device 123 are controlled by the control unit 130.

The drive mechanism 124 has a motor and a gear and is configured so that power for driving the motor is controlled by the control unit 130 and thereby the imaging unit 121 can rotate around a particular rotation axis. Note that the drive mechanism 124 may be configured such that a plurality of motors are provided to have a plurality of rotation axes. The zoom mechanism 125 similarly has a motor and a gear and changes the zoom ratio by moving some of the lenses of the image-formation optical system 122 in the optical axis direction. Further, the focus mechanism 126 similarly has a motor and a gear and changes the focus position by moving some of the lenses of the image-formation optical system 122 in the optical axis direction.

The signal processing unit 127 detects a motion vector of a subject by detecting a difference between frames of multiple frames of the detail images 102 sequentially transmitted from the second imaging unit 120. Then, in the imaging device 100, tracking of a particular subject can be performed by using a motion vector of a particular subject detected by the signal processing unit 127 to control the capturing direction of the second imaging unit 120. The capturing direction of the second imaging unit 120 is controlled by using the control unit 130 to control the drive mechanism 124. Note that the signal processing unit 127 is also able to detect a motion vector of a subject by detecting a difference between frames of multiple frames of the wide angle images 101 from the combining processing unit 115. Note that the subject to be tracked is a subject intended to be monitored, which may be a person, a vehicle, or the like in general.

Description of Relationship of Exposure Level and Acquired Image

It is here assumed that the charge accumulation time of each pixel of the solid state image pickup devices 113a to 113d of the imaging units 111a to 111d is set such that light measurements acquired by the light measurement acquisition units 114a to 114d of the imaging units 111a to 111d are substantially the same. In this case, except a case where all the light measurements acquired by the light measurement acquisition units 114a to 114d of the imaging units 111a to 111d are the same, differences will occur in the signal levels between images captured by respective imaging units 111a to 111d. In this way, when a difference occurs in signal levels between images captured by the imaging units 111a to 111d, an unnatural step difference in signal levels is likely to occur in a seam portion of images in the wide angle image 101 obtained after a combining process.

Figure 3A:
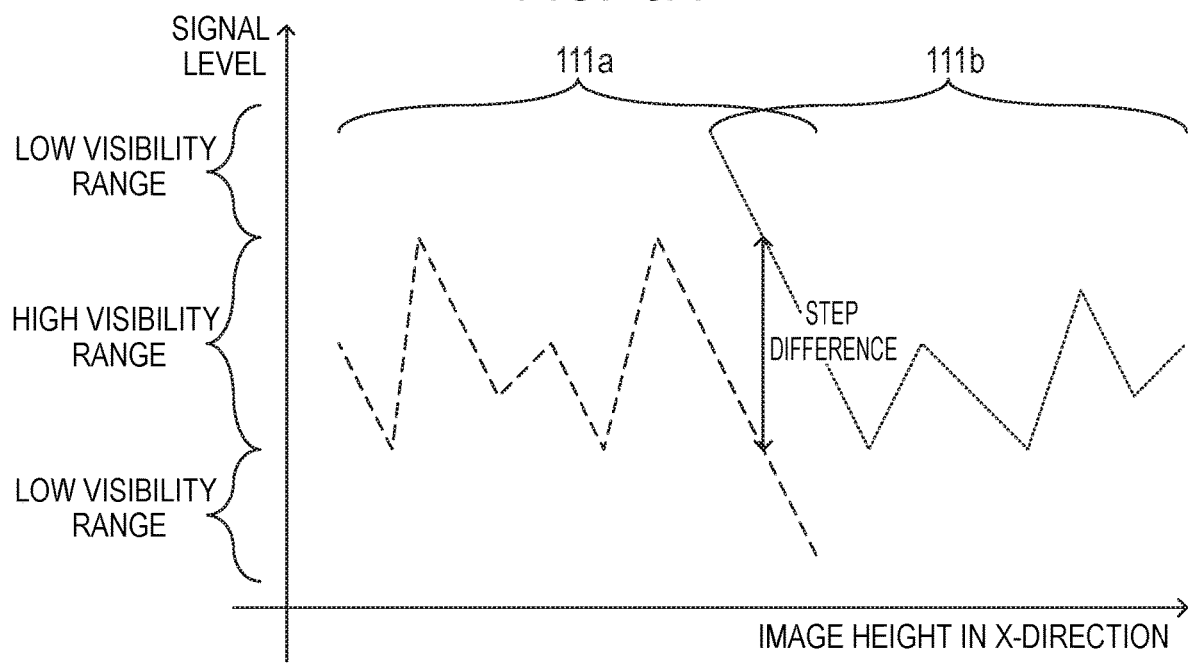
FIG. 3A and FIG. 3B are diagrams illustrating a relationship of an exposure level control method, a step difference in signal levels, and image visibility.

Further, when the difference in signal levels is large between images captured by, for example, adjacent capturing units of the plurality of imaging units 111a to 111d (for example, the imaging unit 111a and the imaging unit 111b), the accuracy in displacement of images required for pattern matching in a combining process will decrease. Then, low accuracy of displacement between images is likely to cause a phenomenon such as double image or missing of a part of image (occlusion) in a seam portion, for example. The example of FIG. 3A illustrates signal levels of images captured by the imaging unit 111a and the imaging unit 111b that are adjacent each other, respectively. As illustrated in FIG. 3A, a large step difference occurs in the difference in signal levels between the image captured by the imaging unit 111a and the image captured by the imaging unit 111b.

On the other hand, as illustrated in FIG. 3A, each image captured by the imaging units 111a to 111d before a combining process is performed is an image captured when each of the imaging units 111a to 111d is set to an exposure level in accordance with brightness of the image. That is, since capturing is performed at an exposure level in accordance with the brightness of the image in the imaging unit 111a, the visibility of a bright region or a dark region is high in the captured image. Similarly, also in the imaging unit 111b, since capturing is performed at an exposure level in accordance with the brightness of the image, the visibility of a bright region or a dark region is high in the captured image.

Therefore, a wide angle image obtained after a combining process is performed on images captured by the imaging units 111a and the imaging unit 111b is an image with high visibility of a bright region or a dark region. However, a large step difference may occur in the signal level difference between images captured by the imaging unit 111a and the imaging unit 111b as described above, and in this case, a wide angle image on which a combining process has been performed becomes a low grade image in which the seam portion is unnatural or double image or missing of a part of image occurs.

In contrast, when the charge accumulation time of each pixel of the solid state image pickup devices 113a to 113d are substantially the same, for example, the signal level difference between the images captured by respective imaging units 111a to 111d is reduced. Thus, the probability of occurrence of an unnatural step difference of signal levels in a seam portion of images or double image or missing of a part of image decreases in a wide angle image obtained after a combining process. That is, a wide angle image on which a combining process has been performed is likely to be a high grade image without unnaturalness.

On the other hand, when the charge accumulation time of each pixel of the solid state image pickup devices 113a to 113d are the same, except a case where all the light measurements in the imaging units 111a to 111d are the same, each image captured by the imaging units 111a to 111d is likely to be an image captured at an unsuitable exposure level. This is likely to result in an image captured at an exposure level that is different from a suitable exposure level in accordance with the brightness of an image which allows for the best visual recognition of a subject. In this case, a wide angle image on which a combining process has been performed is likely to be a low grade image with reduced visibility of a bright region or a dark region.

Figure 3B:
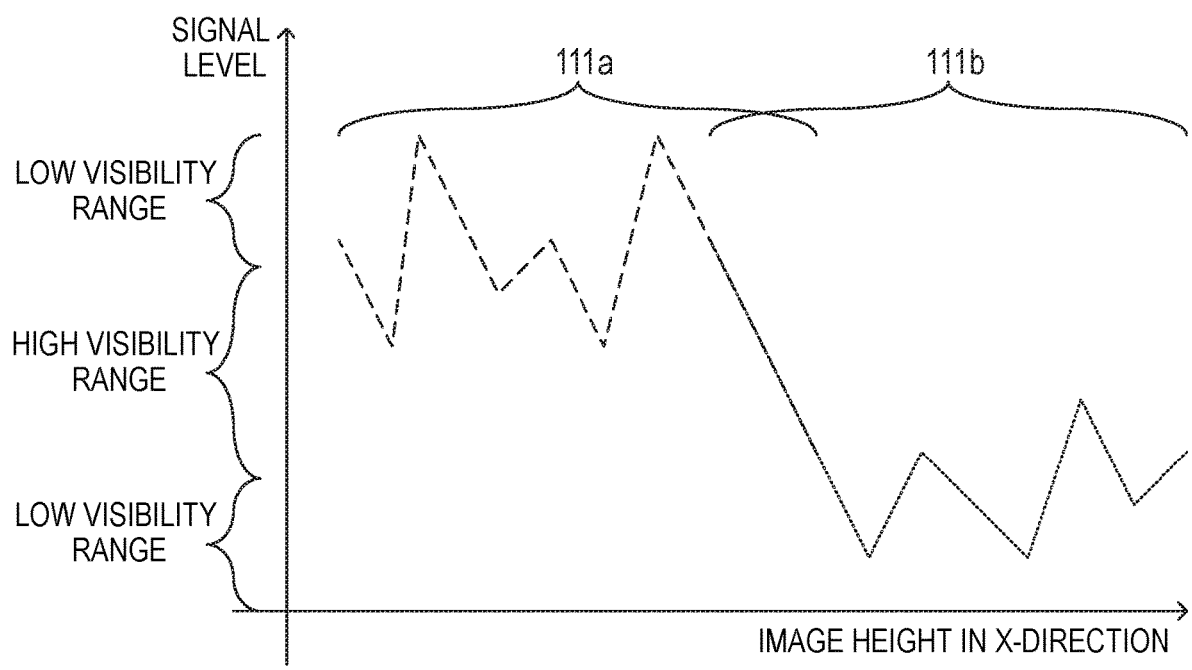

The example of FIG. 3B illustrates signal levels between images captured by the imaging unit 111a and the imaging unit 111b that are adjacent each other, respectively. FIG. 3B illustrates an example in which, because of the same charge accumulation time for the imaging unit 111a and the imaging unit 111b, each image captured by the imaging unit 111a and the imaging unit 111b is an image with an unsuitable exposure level.

As illustrated in FIG. 3B, when images with unsuitable exposure levels are combined, this results in a low grade wide angle image with reduced visibility of the bright region or the dark region. However, when the charge accumulation time of each pixel of the solid state image pickup devices 113a to 113d is set such that the light measurements of the imaging units 111a to 111d are the same, a high grade wide angle image with improved visibility of a bright region or a dark region can be obtained.

As described above, when the charge accumulation time of each pixel of the solid state image pickup devices 113a to 113d are the same, while a natural wide angle image can be obtained by a combing process, a wide angle image with reduced visibility of a bright region or a dark region may be obtained. Further, when the charge accumulation time of each pixel of the solid state image pickup devices 113a to 113d is set such that the light measurements acquired by the imaging units 111a to 111d are the same, while the visibility of brightness is increased, a signal level difference between images may occur resulting in an unnatural seam.
Summary of Exposure Level Control Accordingly, the imaging device 100 of the present embodiment controls the exposure levels of the imaging units 111a to 111d in accordance with whether to acquire a natural wide angle image with a reduced signal level difference in a seam portion or acquire a wide angle image with improved visibility of a bright region or a dark region. The imaging device 100 of the present embodiment controls the exposure levels of the plurality of imaging units 111a to 111d of the first imaging unit 110 based on at least one of the state of the second imaging unit 120 and information included in the detail image 102. For example, when the visibility of a bright region or a dark region of the wide angle image 101 is intended to be improved, the control unit 130 sets the charge accumulation time of each pixel of the solid state image pickup devices 113a to 113d such that the light measurements acquired by the light measurement acquisition units 114a to 114d of the first imaging unit 110 are the same.

Further, when the signal level difference in a seam of images acquired by the plurality of the imaging units 111a to 111d is intended to be reduced to acquire a high grade wide angle image 101 without unnaturalness, the control unit 130 sets the same charge accumulation time for each pixel of the solid state image pickup devices 113a to 113d. When setting the same charge accumulation time of each pixel of the solid state image pickup devices 113a to 113d, the control unit 130 determines the charge accumulation time based on the averaged value of the light measurements acquired by the light measurement acquisition units 114a to 114d of the imaging units 111a to 111d.

First, a basic concept of the exposure level control in the present embodiment will be described. For example, when the user desires to overlook the entire wide angle image, it is considered to be preferable that the user be able to acquire a wide angle image having a natural (not unnatural) seam portion when combined. On the other hand, when tracking of a particular subject is being performed, for example, it is considered to be preferable to improve the visibility of the bright region or the dark region so that the user does not lose sight of the subject rather than overlooks the entire wide angle image as a natural image.

Further, in the imaging device 100 of the present embodiment, an image captured by the second imaging unit 120 is the detail image 102 in which a part of capturing ranges by the plurality of imaging units 111a to 111d of the first imaging unit 110 is captured. In other words, the second imaging unit 120 is a telephoto camera that has a relatively narrower view angle than the first imaging unit 110, and the detail image 102 corresponds to an image that enlarges a part of the wide angle image 101. Thus, when a particular subject is tracked, for example, a tracking operation by using the detail image 102 captured by the second imaging unit 120 is mainly performed. Further, when a subject is lost sight of during a tracking operation by using the detail image 102 captured by the second imaging unit 120, the wide angle image 101 is used to again find the missed subject. That is, the wide angle image 101 is also used as a backup image when a subject is lost sight of during a tracking operation.

As discussed above, it is considered that there are at least two applications in the wide angle image 101 for the case of a use as an image for overlooking the entirety and the case of a use as a backup image in a tracking operation. Further, the determination as to whether the wide angle image 101 is used as an image for overlooking the entirety or used as a backup image in a tracking operation can be made by whether or not a tracking operation of a particular subject is performed in the imaging device 100. That is, it can be determined that the wide angle image 101 is used as a backup image when a tracking operation is performed by the imaging device 100, and the wide angle image 101 is used as an image for overlooking the entirety when no tracking operation is performed. Further, it is desirable that the wide angle image 101 be an image which does not become unnatural through a combining process when used as an image for overlooking the entirety, while it is desirable that the wide angle image 101 be an image with improved visibility of a bright region or a dark region when used as a backup image in a tracking operation.

Further, to acquire the wide angle image 101 that does not become unnatural through a combining process or the wide angle image 101 with improved visibility of a bright region or a dark region, the exposure levels at capturing in the plurality of imaging units 111a to 111d of the first imaging unit 110 are suitably controlled. Thus, the imaging device 100 of the present embodiment is adapted to determine whether or not a tracking operation of a particular subject is performed and, based on the determination result, suitably control the exposure levels at capturing in the plurality of imaging units 111a to 111d of the first imaging unit 110. Specifically, the imaging device 100 controls the charge accumulation time of each pixel of respective solid state image pickup devices 113a to 113d of the first imaging unit 110 to be the same as each other and thereby generates the wide angle image 101 having a natural seam or the like after a combining process. Further, the imaging device 100 sets the charge accumulation time of each pixel of the solid state image pickup devices 113a to 113d such that the light measurements acquired by the light measurement acquisition units 114a to 114d are the same as each other and thereby acquires the wide angle image 101 with improved visibility of a bright region or a dark region.

Determination on Whether or not to Perform Tracking Operation

FIG. 4 is a diagram illustrating a correspondence table of a state of the second imaging unit 120, information included in the detail image 102, and the wide angle image 101 intended to be acquired in the imaging device 100 of the present embodiment. FIG. 4 illustrates an example of item A to item I as specific items used for determining whether or not a tracking operation using the detail image 102 acquired by the second imaging unit 120 is performed. The control unit 130 of the imaging device 100 of the present embodiment determines whether or not a tracking operation is performed by referring to the correspondence table illustrated in FIG. 4 and, based on the determination result, suitably controls the exposure level of the plurality of imaging units 111a to 111d of the first imaging unit 110.

In the correspondence table of FIG. 4, the item A is an item indicating the presence or absence of an automatic tracking operation instruction input from the user through a client device, for example. The control unit 130 refers to the item A and, when no automatic tracking operation instruction is received from the client device, determines that the wide angle image 101 is used as an image for overlooking the entirety. The control unit 130 at this time then controls the charge accumulation time of each pixel of respective solid state image pickup devices 113a to 113d of the first imaging unit 110 to be the same. Thereby, the wide angle image 101 after a combining process is performed is an image with a natural seam or the like.

On the other hand, the control unit 130 refers to the item A and, when an automatic tracking operation instruction is received from the client device, determines that tracking of a particular subject or the like is performed. The control unit 130 at this time then sets the charge accumulation time of each pixel of the solid state image pickup devices 113a to 113d such that the light measurements acquired by the light measurement acquisition units 114a to 114d are the same. Thereby, the wide angle image 101 is an image with improved visibility of a bright region or a dark region.

In the correspondence table of FIG. 4, the item B is one of the items indicating a change in the state of the second imaging unit 120 and is an item regarding a level of change per unit time in the capturing direction of the second imaging unit 120. The control unit 130 acquires the level of change per unit time in the capturing direction of the second imaging unit 120 based on drive information of the driving mechanism 124 of the second imaging unit 120.

For example, when the change per unit time in the capturing direction of the second imaging unit 120 is large, it is considered that the user mainly pays attention to the detail image 102 captured by the second imaging unit 120, that is, a tracking operation of a particular subject or the like is performed. The control unit 130 refers to the item B and, when the change per unit time in the capturing direction of the second imaging unit 120 is large (for example, larger than a predetermined threshold concerning change in the capturing direction), determines that tracking of a particular subject or the like is performed. The control unit 130 at this time sets the charge accumulation time of each pixel of the solid state image pickup devices 113a to 113d such that the light measurements acquired by the light measurement acquisition units 114a to 114d are the same.

On the other hand, the control unit 130 refers to the item B and, when the change per unit time in the capturing direction of the second imaging unit 120 is small (for example, less than the predetermined threshold concerning change in the capturing direction), determines that the wide angle image 101 is used as an image for overlooking the entirety. The control unit 130 at this time controls charge accumulation time of each pixels of respective solid state image pickup devices 113a to 113d to be the same.

In the correspondence table of FIG. 4, the item C and the item D each are one of the items indicating a change in the state of the second imaging unit 120. The item C is an item regarding a level of change per unit time of a capturing view angle (in a zoomed state) in the second imaging unit 120, and the item D is an item regarding a level of change per unit time of a focus position (in a focused state) in the second imaging unit 120. The control unit 130 acquires the level of change per unit time in a zoomed state of the second imaging unit 120 based on drive information of the zoom mechanism 125 of the second imaging unit 120.

Further, the control unit 130 acquires the level of change per unit time in a focused state of the second imaging unit 120 based on drive information of the focus mechanism 126 of the second imaging unit 120. For example, when the change per unit time in a zoomed state or a focused state in the second imaging unit 120 is large, it is considered that the user mainly pays attention to the detail image 102 and thus a tracking operation of a particular subject or the like is performed. The control unit 130 refers to the item C and, when the change per unit time in a zoomed state of the second imaging unit 120 is large (for example, larger than a predetermined threshold concerning change in zoom), determines that a tracking operation is performed.

On the other hand, the control unit 130 refers to the item C and, when the change per unit time in a zoomed state of the second imaging unit 120 is small (for example, less than a predetermined threshold concerning change in zoom), determines that the wide angle image 101 is used as an image for overlooking the entirety. Further, the control unit 130 refers to the item D and, when the change per unit time in a focused state of the second imaging unit 120 is large (for example, larger than a predetermined threshold concerning change in focus), determines that a tracking operation is performed.

On the other hand, the control unit 130 refers to the item D and, when the change per unit time in a focused state of the second imaging unit 120 is small (for example, less than a predetermined threshold concerning change in focus), determines that the wide angle image 101 is used as an image for overlooking the entirety. Then, when determining that the change per unit time in a zoomed state or a focused state is large, the control unit 130 controls the charge accumulation time of each pixel of the solid state image pickup devices 113a to 113d such that the light measurements acquired by the light measurement acquisition units 114a to 114d are the same. On the other hand, when determining that the change per unit time in a zoomed state or a focused state is small, the control unit 130 controls the charge accumulation time of each pixel of the solid state image pickup devices 113a to 113d to be the same.

In the correspondence table of FIG. 4, the item E is one of the items indicating information included in the detail image 102 captured by the second imaging unit 120 and is an item indicating whether or not a particular subject is detected in the detail image 102. The control unit 130 determines whether or not a particular subject is detected based on a motion vector of a subject detected by the signal processing unit 127 of the second imaging unit 120. Note that a particular subject is a subject intended to be monitored such as a person, a vehicle, or the like as described above. When a particular subject is detected in the detail image 102, it is considered that the user is paying attention to the detail image 102 and thus a tracking operation of a particular subject or the like is performed. The control unit 130 refers to the item E and, when a particular subject is detected in the detail image 102, determines that a tracking operation is performed.

On the other hand, when a particular subject is not detected in the detail image 102, the control unit 130 determines that no tracking operation is performed or the particular subject is lost sight of. Note that the case where a particular subject is not detected corresponds to a state where only the background such as sky or ground is captured as the detail image 102, for example, and in such a case, there is a high likelihood of no tracking operation by using the detail image 102 being performed or the particular subject being lost sight of. Then, when determining that a particular subject is detected, the control unit 130 sets the charge accumulation time of each pixel of the solid state image pickup devices 113a to 113d such that the light measurements acquired by the light measurement acquisition units 114a to 114d are the same. On the other hand, when determining that no particular subject is detected, the control unit 130 controls the charge accumulation time of each pixel of the solid state image pickup devices 113a to 113d to be the same.

The control unit 130 of the imaging device 100 of the present embodiment refers to the item A to the item E of FIG. 4 to determine whether or not a tracking operation is performed and, based on the determination result, controls the exposure level of the plurality of imaging units 111a to 111d of the first imaging unit 110. Thereby, when it is determined that a tracking operation is performed, the wide angle image 101 is an image with improved visibility of a bright region or a dark region and is easily used as a backup image in a tracking operation. On the other hand, when it is determined that no tracking operation is performed, the wide angle image 101 is acquired as a natural image that is not unnatural in a seam or the like due to a combining process, and such the wide angle image 101 is an image which is clear when overlooked, for example.

Example of Exposure Level Control Based on Probability of Losing Sight of Subject During Tracking Operation The imaging device 100 of the present embodiment may calculate a probability of losing sight of a subject when a tracking operation using the detail image 102 is performed by the second imaging unit 120 and, based on the probability, determine whether or not to cause the wide angle image 101 to be an image easily used for backup in the tracking operation. For example, when the probability of losing sight of a subject during a tracking operation is high, the imaging device 100 of the present embodiment has the wide angle image 101 as an image with improved visibility of a bright region or a dark region to facilitate a use of the wide angle image 101 as a backup image of a tracking operation. In contrast, when the probability of losing sight of the subject is low, the imaging device 100 of the present embodiment has the wide angle image 101 not as a backup image of a tracking operation but as an image with a natural seam or the like caused by a combining process to facilitate a use of the wide angle image 101 as an image for overlooking the entirety.

It is here considered that the case of losing sight of a subject during a tracking operation is likely to occur when disturbance such as vibration is applied to the imaging device 100 during a tracking operation and thereby a subject moves out of the view angle of the second imaging unit 120, for example. Further, it is considered that a state where a subject moves out of the view angle of the second imaging unit 120 is likely to occur when the view angle of the second imaging unit 120 is narrow or when a subject in the detail image 102 is large, for example. Thus, in the present embodiment, a probability of losing sight of the subject is determined based on the capturing view angle of the second imaging unit 120 or a size of the subject in the detail image 102, and based on the probability, it is determined whether or not to facilitate the use of the wide angle image 101 as a backup image in a tracking operation.

In the correspondence table of FIG. 4, the item F is one of the items indicating a change in the state of the second imaging unit 120 and is an item indicating the capturing view angle (zoomed state) in the second imaging unit 120. The control unit 130 acquires information on the capturing view angle (zoomed state) of the second imaging unit 120 based on drive information of the zoom mechanism 125 of the second imaging unit 120 as described above. The control unit 130 then refers to the item F and, when the capturing view angle of the second imaging unit 120 is narrow (for example, less than a predetermined threshold concerning the capturing view angle), determines that there is a high probability of losing sight of the subject in a tracking operation. In this case, the control unit 130 sets the charge accumulation time of each pixel of the solid state image pickup devices 113a to 113d such that the light measurements acquired by the light measurement acquisition units 114a to 114d are the same.

On the other hand, the control unit 130 refers to the item F and, when the capturing view angle of the second imaging unit 120 is wide (for example, greater than the predetermined threshold concerning the capturing view angle), determines that there is a low probability of losing sight of the subject in a tracking operation. In this case, the control unit 130 controls the charge accumulation time of each pixel of the solid state image pickup devices 113a to 113d to be the same.

Further, in the correspondence table of FIG. 4, the item G is one of the items indicating information included in the detail image 102 captured by the second imaging unit 120 and is an item regarding a size of a subject detected in the detail image 102. The control unit 130 detects a subject based on a motion vector detected by the signal processing unit 127 of the second imaging unit 120 as described above and further determines the size of a subject based on the number of pixels forming the detected subject region or the like. The control unit 130 then refers to the item G and, when the subject in the detail image 102 is large (for example, greater than a predetermined threshold concerning the size), determines that there is a high probability of losing sight of the subject in a tracking operation. In this case, the control unit 130 sets the charge accumulation time of each pixel of the solid state image pickup devices 113a to 113d such that the light measurements acquired by the light measurement acquisition units 114a to 114d are the same.

On the other hand, the control unit 130 refers to the item G and, when the size of the subject in the detail image 102 is small (for example, less than the predetermined threshold concerning the size), determines that there is a low probability of losing sight of the subject in a tracking operation. In this case, the control unit 130 controls the charge accumulation time of each pixel of the solid state image pickup devices 113a to 113d to be the same.

Example of Exposure Level Control in Accordance with Portion Paid Attention to

The imaging device 100 of the present embodiment may determine which portion the user is paying attention to in the wide angle image 101 based on the capturing direction of the second imaging unit 120 and control the exposure level of the plurality of imaging units 111a to 111d of the first imaging unit 110. As described above, a portion where an unnatural step difference in signal levels or double image or missing of a part of image occurs in the wide angle image 101 is a seam portion of images captured by the plurality of imaging units 111a to 111d. Therefore, when the user is paying attention to a seam portion in the wide angle image 101, it is preferable to suppress as much as possible the occurrence of an unnatural step difference in signal levels or double image or missing of a part of image.

On the other hand, when the user is paying attention to a portion other than the seam in the wide range image 101, it is preferable to improve the visibility of the portion other than the seam. It is thus considered that the direction in which the user is paying attention to is likely to be the direction of the detail image 102 captured by the second imaging unit 120, that is, the capturing direction of the second imaging unit 120.

Thus, the imaging device 100 of the present embodiment determines whether the capturing direction of the second imaging unit 120 is close to or far from the direction of a seam of images captured by the plurality of imaging units 111a to 111d of the first imaging unit 110. For an imaging unit of the plurality of imaging units 111a to 111d which has the direction of a seam that is far from the capturing direction of the second imaging unit 120, the imaging device 100 then performs exposure level control so as to improve the visibility.

On the other hand, for an imaging unit of the plurality of imaging units 111a to 111d which has the direction of a seam that is close to the capturing direction of the second imaging unit 120, the imaging device 100 performs exposure level control so as to suppress occurrence of a step difference in signal levels or double image or missing of a part of image.

Figure 5:
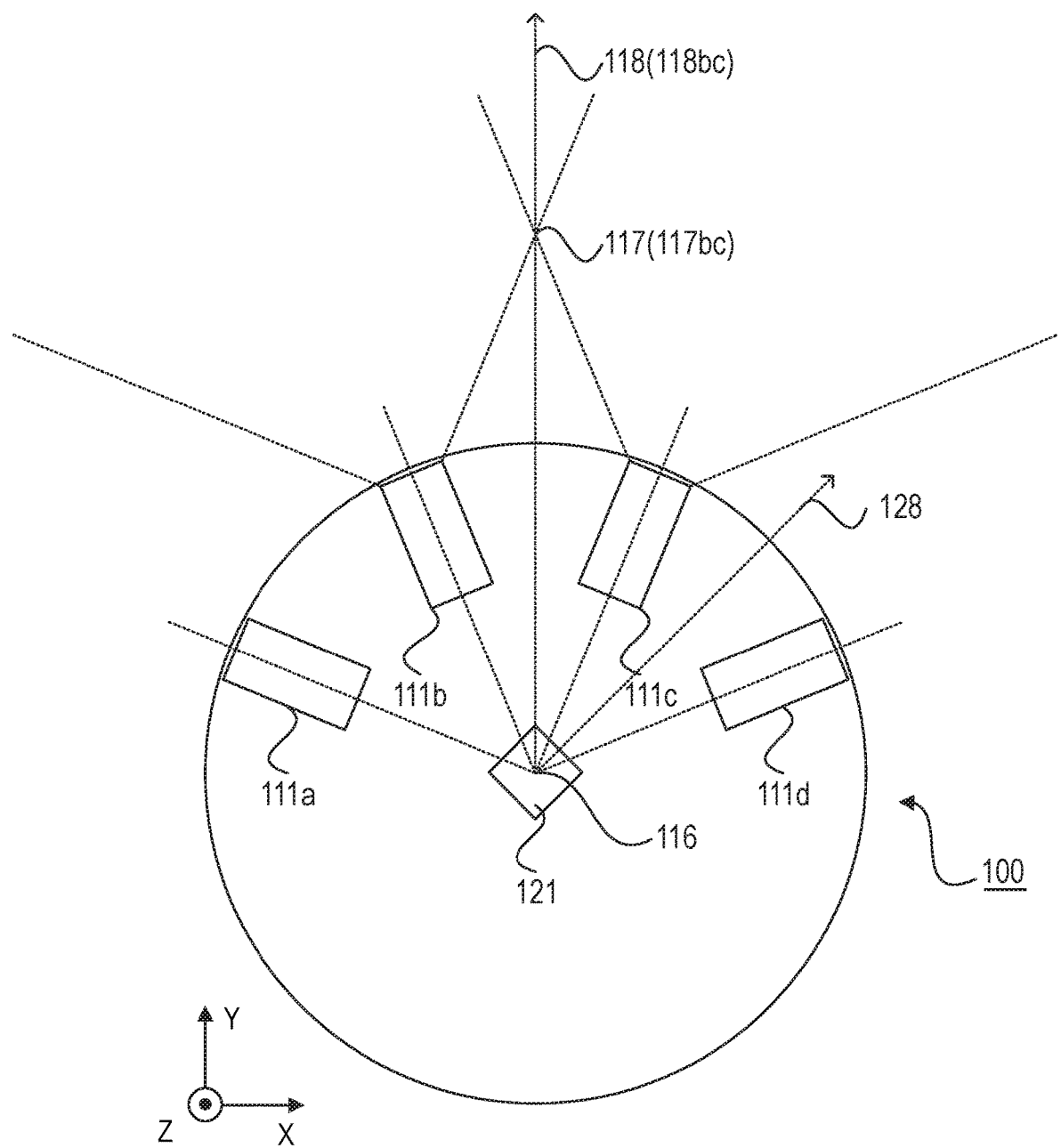
FIG. 5 is a diagram illustrating the direction of a seam.

In the present embodiment, the direction of a seam between images of the plurality of imaging units 111a to 111d is now be defined as illustrated in FIG. 5. A point 116 at which optical axes of the image-formation optical systems 112a to 112d of the plurality of imaging units 111a to 111d intersect with each other is defined as the center of the wide angle image 101, and a point 117 at which image capturing ranges of adjacent imaging units intersect with each other is defined as the center of the seam.

Further, the direction connecting the center point 116 of the wide angle image 101 to the center point 117 of the seam is defined as a direction 118 of a seam between images captured by adjacent imaging units. Furthermore, the capturing direction 128 of the second imaging unit 120 is the optical axis direction of the image-formation optical system 122 of the second imaging unit 120. FIG. 5 is a diagram illustrating a direction of a seam between the imaging units 111b and 111c.

In FIG. 5, a point 117bc is the center of a seam between the image captured by the imaging unit 111b and the image captured by the imaging unit 111c, and a direction 118bc is a direction of a seam between the image captured by the imaging unit 111b and the image captured by the imaging unit 111c.

Further, in the correspondence table of FIG. 4, the item H is one of the items indicating a change in the state of the second imaging unit 120 and is an item illustrating the capturing direction of the second imaging unit 120. The control unit 130 acquires information on the capturing direction of the second imaging unit 120 based on drive information of the drive mechanism 124 of the second imaging unit 120 as described above. The control unit 130 then refers to the item H and sets the charge accumulation time of the solid state image pickup devices so as to have the same light measurement for imaging units which have the direction of a seam that is far from the capturing direction (for example, greater than a predetermined threshold concerning the seam direction) of the second imaging unit 120 of the imaging units 111a to 111d.

On the other hand, the control unit 130 refers to the item H and sets the charge accumulation time of the solid state image pickup devices controls the charge accumulation time of each pixel of solid state image pickup devices to be the same for imaging units which have the direction of a seam that is close to the capturing direction (for example, less than a predetermined threshold concerning the seam direction) of the second imaging unit 120 of the imaging units 111a to 111d.

Example of Exposure Level Control in Accordance with Distance from Capturing Direction of Second Imaging Unit Further, the imaging device 100 of the present embodiment may determine whether the capturing direction of the plurality of imaging units 111a to 111d of the first imaging unit 110 is close to or far from the capturing direction of the second imaging unit 120 and control the exposure level of the plurality of imaging units 111a to 111d of the first imaging unit 110.

For example, of the plurality of imaging units 111a to 111d, the control of the exposure levels is changed between an imaging unit close to the capturing direction of the second imaging unit 120 and an imaging unit far from the capturing direction of the second imaging unit 120. Specifically, a use of the wide angle image 101 as a backup image of a tracking operation is facilitated for an imaging unit of the plurality of imaging units 111a to 111d which captures the direction close to the capturing direction of the second imaging unit 120. In contrast, a use of the wide angle image 101 as an image for overlooking the entirety is facilitated for an imaging unit of the plurality of imaging units 111a to 111d which captures the direction far from the capturing direction of the second imaging unit 120.

In the correspondence table of FIG. 4, the item I is one of the items indicating a change in the state of the second imaging unit 120 and is an item indicating the capturing direction of the second imaging unit 120. The control unit 130 acquires information on the capturing direction of the second imaging unit 120 based on drive information of the drive mechanism 124 as described above. The control unit 130 then refers to the item I and sets the charge accumulation time of the solid state image pickup devices so as to have the same light measurement for imaging units which are close to the capturing direction (for example, less than a predetermined threshold concerning the capturing direction) of the second imaging unit 120 of the imaging units 111a to 111d.

On the other hand, the control unit 130 refers to the item I and controls the charge accumulation time of each pixel of the solid state image pickup devices to be the same for imaging units which are far from the capturing direction (for example, greater than or equal to a predetermined threshold concerning the direction) of the second imaging unit 120 of the imaging units 111a to 111d.

Conclusion

As described above, whether it is preferable to use the wide angle image 101 as a natural wide angle image when combined or to use the wide angle image 101 as a wide view angle with improved visibility of the bright region or the dark region is different in accordance with the state of the second imaging unit 120 or the detail image 102. Thus, the imaging device 100 of the present embodiment determines which type of the wide angle image is used based on at least one of the state of the second imaging unit 120 and information on the detail image 102 and changes a control method of the exposure level of the plurality of imaging units 111a to 111d. Thereby, in the imaging device 100 of the present embodiment, respective optimal wide angle images can be acquired for both a case where reduction of an unnatural signal level difference caused by a combining process is intended and a case where improvement of visibility of a bright region or a dark region is intended.

Difference in Exposure Level

In the above description, when improvement of visibility of a bright region or a dark region is intended, the charge accumulation time of each pixel of the solid state image pickup devices 113a to 113d is set such that light measurements acquired by the imaging units 111a to 111d are the same. On the other hand, when acquisition of a natural image in a combining process is intended, the same charge accumulation time is set for each pixel of the solid state image pickup devices 113a to 113d. However, it is not necessarily required to be set as above. For example, the difference of the exposure levels of the plurality of imaging units 111a to 111d is smaller when acquisition of a natural image in a combining process is intended than when improvement of visibility of a bright region or a dark region is intended. Note that the difference in exposure level means a standard deviation of the exposure levels of the plurality of imaging units 111a to 111d.

Further, the control method of the exposure level may be such control that switches the exposure levels stepwise. For example, there may be a case where the user intends to ensure the visibility of a bright region or a dark region to some degrees and also reduce an unnatural signal level difference in a combining process to some degrees. In such a case, for example, an intermediate level between an exposure level intended to improve the visibility of a bright region or a dark region and an exposure level intended to acquire a natural image in a combining process may be used.

Acquisition Method of Light Measurement

Further, the acquisition method of a light measurement may be changed between a case where improvement of visibility of a bright region or a dark region is intended and a case where acquisition of a natural image in a combining process is intended. For example, while it is considered that a case of acquisition of a natural image in a combining process being intended is a case where the whole wide angle image 101 is overlooked as described above, it is more preferable that the exposure level be set at a suitable level even when the whole wide angle image 101 is overlooked. In this case, for example, when light measurements of the plurality of imaging units 111a to 111d are acquired, a division light measurement scheme is used in which an averaged light measurement of signal levels of the entire image including a seam portion described above is used. Thereby, the wide angle image 101 set to a suitable exposure level can be acquired even when the entire wide angle image 101 is overlooked.

On the other hand, when improvement of visibility of a bright region or a dark region is intended, each of images acquired by the plurality of imaging units 111a to 111d is preferably set to a corresponding suitable exposure level. Thus, a center-weighted light measurement scheme is used that uses an averaged light measurement of signal levels of the center portions of images other than seam portions. In other words, when acquiring a natural image in a combining process, it is preferable to calculate a light measurement by giving more weighting to the circumference part of an image than in the case of improving the visibility of a bright region or a dark region.

Example of Adjusting Signal Level on Post-State

When the charge accumulation time of each pixel of the solid state image pickup devices 113a to 113d is set such that light measurements acquired by the imaging units 111a to 111d are the same, the signal level may be adjusted for each region of the wide angle image 101 after the wide angle image 101 is generated by a combining process. As discussed above, by adjusting the signal level after the wide angle image 101 is generated, it is possible to reduce the signal level difference in the seam portion.

Note that, when the signal level is adjusted after the wide angle image 101 is generated, it is more difficult to reduce a signal level difference on a seam for a case of the same charge accumulation time for each pixel of the solid state image pickup devices 113a to 113d. Further, even though the signal level is adjusted after the wide angle image 101 is generated, reduction in calculation accuracy of a displacement of image calculated in pattern matching in a combining process may remain to some degrees. Therefore, when acquisition of a natural image in a combining process is intended, even when adjusting the signal level after generating the wide angle image 101, it is preferable to set the same charge accumulation time for each pixel of the solid state image pickup devices 113a to 113d.

Example of Number of First Imaging Units

While FIG. 1A illustrates the example in which the first imaging unit 110 is formed of four imaging units 110a to 110d, the first imaging unit 110 is not necessarily required to be formed of four imaging units. For example, the first imaging unit may be formed of a single imaging unit or may be formed of two, three, or five or more imaging units. Further, the capturing range of the first imaging unit 110 may not be the range illustrated in FIG. 1B, but the entire circumference of 360 degrees may be a capturing range, for example. A wider capturing range of the first imaging unit 110 is more preferable because of a higher probability of being able to again detect a subject to be tracked.

Other Configuration Examples of Second Imaging Unit

While FIG. 2 illustrates the example in which the second imaging unit 120 has the zoom mechanism 125, the zoom mechanism 125 may not be provided. When the zoom mechanism 125 is provided, however, it is possible to acquire the detail image 102 with such a capturing view angle that allows easier detection of motion of a subject of a tracking object regardless of the distance to or the size of the subject to be tracked. This advantageously results in a lower probability of losing sight of a subject during an automatic tracking operation. Further, when the zoom mechanism 125 is provided, it is more preferable to provide a function of automatically adjusting the capturing view angle in accordance with the size of a subject to be tracked.

Similarly, while FIG. 2 illustrates the example in which the second imaging unit 120 has the focus mechanism 126, the focus mechanism 126 may not be provided. However, it is more preferable to have the focus mechanism 126 because it is possible to clearly capture a subject of a tracking object regardless of the distance to the subject. When the focus mechanism 126 is provided, it is more preferable to provide a function of automatically adjusting a focus position in accordance with the distance to a subject to be tracked.

Note that, when the second imaging unit 120 does not have the zoom mechanism 125 or the focus mechanism 126, none of the item C, the item D, and the item F can be used in the correspondence table of FIG. 4. In this case, it is preferable to use the items other than the above to set the exposure levels of the plurality of imaging units 111a to 111d as described above.

Other Examples of Transfer Unit

While FIG. 2 illustrates the case where the single transfer unit 140 is used and the wide angle image 101 or the detail image 102 is selected by a switch and thereby transferred sequentially to the same network, such a configuration is not necessarily required to be employed. However, it is preferable to deliver the image via the same network because the correspondence between the wide angle image 101 and the detail image 102 can be easily recognized.

Other Examples of Tracking Function

While FIG. 2 illustrates the example in which the second imaging unit 120 has a signal processing unit 127 and signal processing unit 127 detects a motion vector of a subject, the client device side may have a function of detecting a motion vector. In this case, the capturing direction or the like of the second imaging unit 120 can be controlled by transferring the detail image 102 to the client device and using information on the motion vector detected by the client device side to control the drive mechanism 124.

Presence or Absence of Network

FIG. 2 illustrates the example in which the imaging device 100 has the transfer unit 140, transfers an image to the client device side, and operates by using an instruction from the client device side. In contrast, for example, the imaging device 100 may have a memory device that stores image data, a viewer that displays an image, and an interface unit that accepts a user instruction. Further, the imaging device 100 may have any one or two or all of the memory device, the viewer, and the interface unit.

Other Examples of Exposure Level Control of First Imaging Unit

While the example of controlling the charge accumulation time in each pixel of the solid state image pickup devices 113a to 113d has been illustrated as a method of controlling the exposure level of the plurality of imaging units 111a to 111d in the above description, this method is not necessarily required to be used. For example, the exposure level may be controlled by controlling the signal amplification factor (gain) in the solid state image pickup devices 113a to 113d. When the solid state image pickup devices 113a to 113d each have an analog-to-digital (AD) conversion function therein, it is preferable to control the signal amplification factor (analog gain) before AD conversion is performed.

Further, when the image-formation optical systems 112a to 112d of the plurality of imaging units 111a to 111d each have an aperture control mechanism, the control unit 130 may control the exposure level of the plurality of imaging units 111a to 111d by controlling the aperture control mechanism. Furthermore, when the image-formation optical systems 112a to 112d each have an optical absorption filter and an insertion and extraction mechanism thereof, the exposure level may be controlled by inserting and extracting these optical absorption filters as appropriate. Alternatively, when the optical absorption filter is a variable transmissivity filter formed of liquid crystal or the like, the exposure level may be controlled by controlling the voltage applied to the variable transmissivity filter. These methods of controlling exposure levels may be used in appropriate combination.

The control performed by the control unit 130 of the imaging device 100 of the present embodiment described above can be implemented when the CPU executes a control program according to the present embodiment, for example. The control program according to the present embodiment may be prepared in a non-volatile memory (not illustrated) or the like in advance or may be expanded to a memory device or the like via a network or a storage medium.

Example of Hardware Configuration

Figure 6:
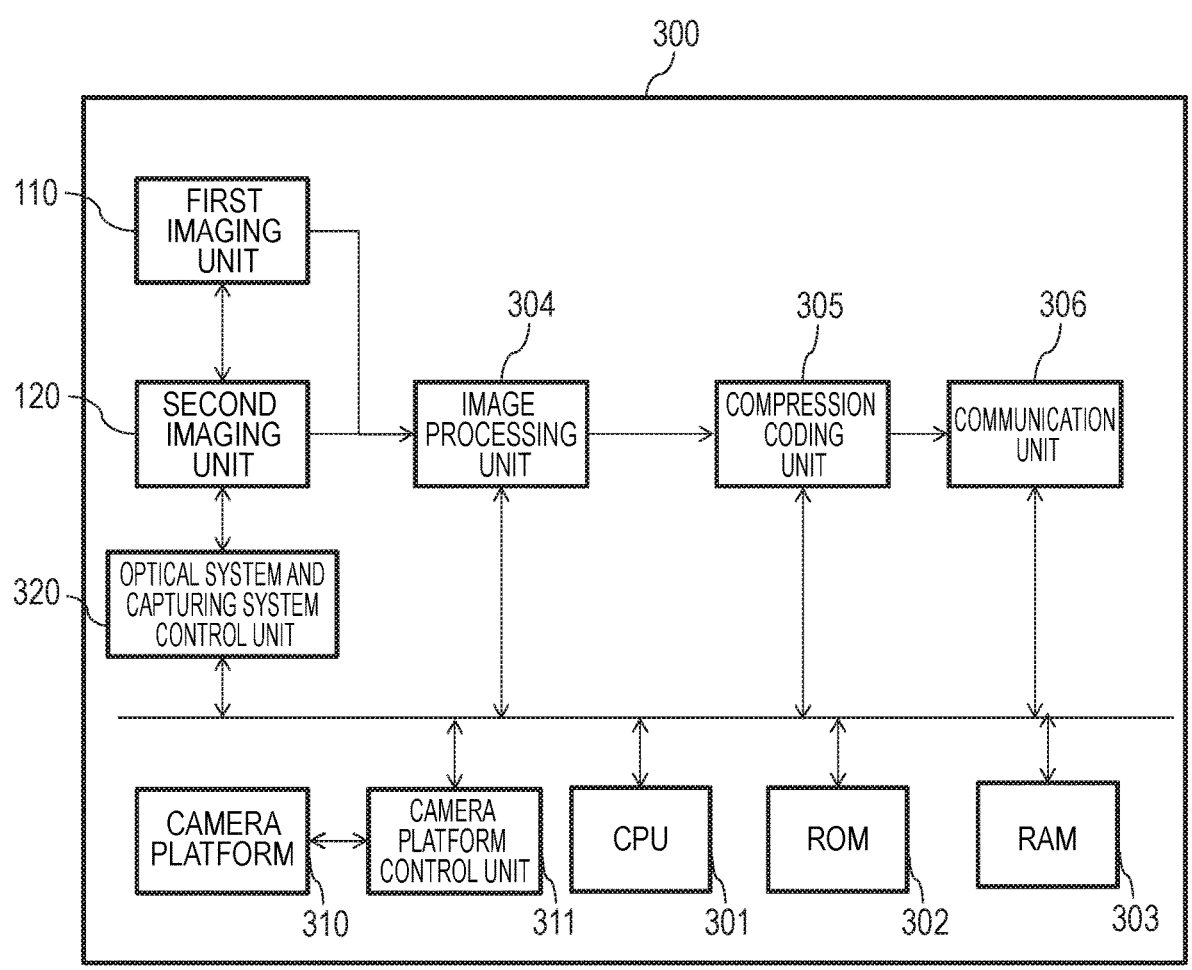
FIG. 6 is a diagram illustrating a hardware configuration example of an imaging device of the present embodiment.

FIG. 6 is a diagram illustrating an example of a hardware configuration of an imaging device 300 of the present embodiment including the first imaging unit 110 and the second imaging unit 120 described above according to the present embodiment. In the imaging device 300 illustrated in FIG. 6, a CPU 301 executes a control program according to the present embodiment to control each unit of the hardware configuration. The imaging device 300 illustrated in FIG. 6 has the first imaging unit 110, the second imaging unit 120, an optical system and capturing system control unit 320, an image processing unit 304, a compression coding unit 305, a communication unit 306, the CPU 301, a ROM 302, a RAM 303, a camera platform control unit 311, and a camera platform 310.

The ROM 302 stores a control program according to the present embodiment and various parameters required for startup or operation of the imaging device 300, and the program and the parameters are read out when required. The RAM 303 is used as a work RAM and performs temporal storage of image data during expansion or processing of a program. The CPU 301 executes the control program expanded to the RAM 303 to control each unit of the imaging device 300 of the present embodiment and also performs various operations or the like. In the case of the present embodiment, the control and operation in the CPU 301 includes determination of a tracking operation, decision of an acquisition method of a light measurement, exposure level control, exposure control based on a probability of losing sight of a subject, exposure control in accordance with the distance from a capturing direction, adjustment of a signal level, control of transfer, or the like described above.

The first imaging unit 110 is a multi-view wide angle camera having the plurality of imaging units 111a to 111d illustrated in FIG. 2 described above. The second imaging unit 120 is a monocular telephoto camera illustrated in FIG. 2. The optical system and capturing system control unit 320 is an integrated circuit (IC) or the like used for driving and controlling the first imaging unit 110 or the second imaging unit 120. The optical system and capturing system control unit 320 performs the exposure level control or the like described above of the first imaging unit 110 or the drive control or the like of the focus mechanism 126 and the zoom mechanism 125 of the second imaging unit 120 as described above under the control of the CPU 301.

Further, the optical system and capturing system control unit 320 controls driving of the focus mechanism provided in the first imaging unit 110. Each image data acquired by the multi-view wide angle camera of the first imaging unit 110 is transmitted to the imaging processing unit 304. Similarly, image data acquired by the monocular telephoto camera of the second imaging unit 120 is transmitted to the image processing unit 304.

The camera platform 310 is a camera platform having the drive mechanism 124 of FIG. 2 described above. The camera platform control unit 311 is a driver IC that supplies drive power or the like to the drive mechanism 124 of the camera platform 310. The camera platform control unit 311 supplies drive power to the drive mechanism 124 of the camera platform 310 under the control of the CPU 301 to control the capturing direction of the second imaging unit 120.

The image processing unit 304 and the compression coding unit 305 are made of a digital signal processor (DSP) or the like, for example. The image processing unit 304 performs various image processing such as a development process, white balance adjustment, or the like.

Further, the image processing unit 304 performs the above-described combining process on each image data acquired by the multi-view wide angle camera of the first imaging unit 110, the above-described motion vector detection using image data acquired from the monocular telephoto camera of the second imaging unit 120, or the like. The image data on which image processing has been performed by the image processing unit 304 is transmitted to the communication unit 306 after compression coding by a predetermined compression scheme is performed by the compression coding unit 305. The image processing unit 304 and the compression coding unit 305 perform image processing and compression code processing under the control of the CPU 301.

The communication unit 306 corresponds to the transfer unit 140 of FIG. 2 described above and is a communication module such as a wired LAN, a wireless LAN, or the like. The communication unit 306 sends out image data compression-coded by the compression coding unit 305 to a client device via a network and, further, receives a command transmitted from the client device via the network and transmits the command to the CPU 301.

Figure 7:
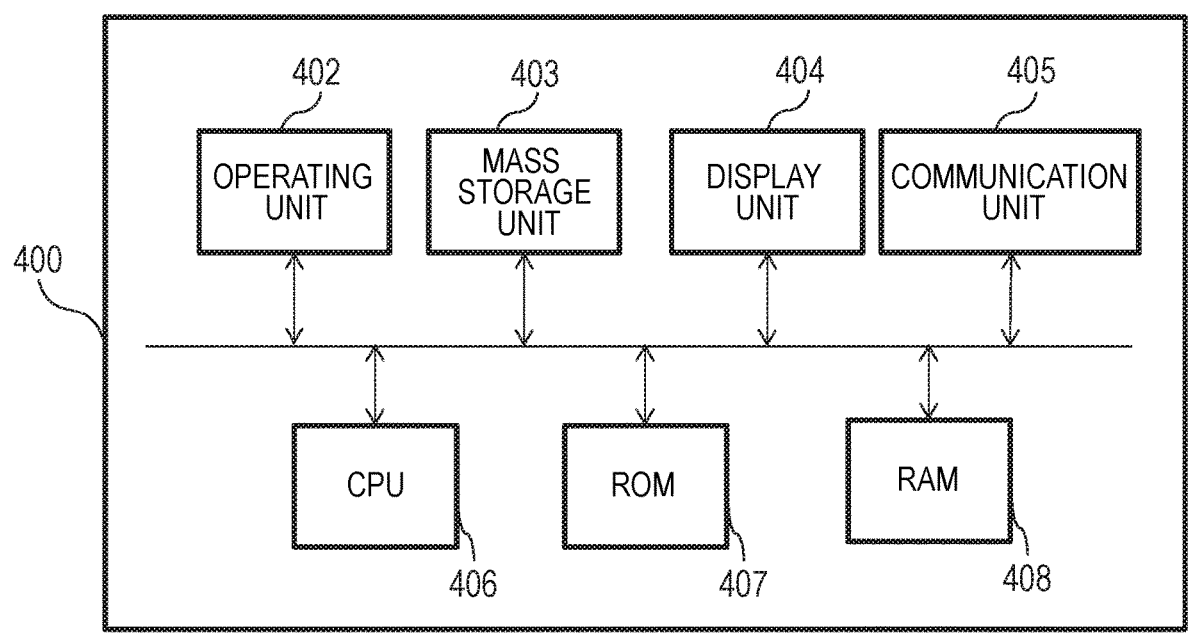
FIG. 7 is a diagram illustrating a hardware configuration example of a client device of the present embodiment.

FIG. 7 is a diagram illustrating a general hardware configuration example of a personal computer (PC) as an example of a client device 400 according to the present embodiment. The client device 400 of the present embodiment has a CPU 406, a ROM 407, a RAM 408, an operating unit 402, a mass storage unit 403, a display unit 404, and a communication unit 405.

The operating unit 402 is a mouse, a keyboard, a touchscreen, or the like, for example, and accepts operation input from the user. The display unit 404 is a display device such as a liquid crystal panel, an organic EL panel, or the like and displays an image, a user interface image, or the like. The mass storage unit is a hard disk drive (HDD), a solid state drive (SDD), or the like and stores image data, a program, and the like. The communication unit 405 is a communication module such as a wired LAN, a wireless LAN, or the like, which is connected to the imaging device 300 of the present embodiment via a network and receives image data transmitted from the imaging device 300 or transmits a command or the like to the imaging device 300.

The ROM 407 stores a program for performing control of the imaging device 300, image display, or the like according to the present embodiment in the client device 400, and the program is read out from the ROM 407 and expanded to the RAM 408. The RAM 408 is used as a work RAM and performs temporal storage of various data during expansion or processing of the program. The CPU 406 executes the program expanded to the RAM 408 and performs various control or processes for the client device 400 of the present embodiment. For example, the CPU 406 performs various control and processes according to the present embodiment such as control that, upon receiving an instruction of an automatic tracking operation input from the user via the operating unit 402, generates a command for the automatic tracking operation and transmits the command from the communication unit 405 to the imaging device 300. Further, when compression-coded image data is transmitted from the imaging device 300, the CPU 406 extends and decodes the image data and transmits the extended and decoded image data to the display unit 404 for display.

As described above, in the imaging device of the present embodiment, optimal exposure level control is performed for a case where reduction in unnatural signal level difference caused by a combining process is intended and for a case where improvement of visibility of a bright region or a dark region is intended, respectively. Thereby, according to the imaging device of the present embodiment, a high-grade combined image (wide angle image) can be generated.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-207353, filed Oct. 26, 2017, which is hereby incorporated by reference herein in its entirety.

What is claimed is:

1. An imaging device comprising:
   a first imaging unit that has a plurality of imaging units arranged such that capturing ranges partially overlap with each other, and that generates a combined image in which images captured by the plurality of imaging units are connected and combined with each other;
   a second imaging unit that captures a portion of a capturing range of the first imaging unit; and
   a control unit that controls exposure levels of the plurality of imaging units and determines whether to perform (a) first exposure level control of reducing a difference in signal levels between images captured by the plurality of imaging units, or (b) second exposure level control of improving visibility of brightness of images captured by the plurality of imaging units, based on at least one of a state of the second imaging unit and information included in an image captured by the second imaging unit.

2. The imaging device according to claim 1, wherein the first exposure level control is exposure level control of setting substantially the same charge accumulation time of each pixel of image pickup devices of the plurality of imaging units, and
   wherein the second exposure level control is exposure level control of controlling charge accumulation time of each pixel of the image pickup devices such that light measurements acquired by the plurality of imaging units are substantially the same.

3. The imaging device according to claim 2, wherein the control unit acquires the light measurements by giving more weighting to a seam portion of the combined images when performing the first exposure level control than when performing the second exposure level control.

4. The imaging device according to claim 1, wherein the control unit controls a difference in exposure levels between the plurality of imaging units to be less when performing the first exposure level control than when performing the second exposure level control.

5. The imaging device according to claim 1, wherein the second imaging unit has a drive mechanism capable of changing a capturing direction, and
   wherein the control unit acquires the capturing direction of the second imaging unit as the state of the second imaging unit.

6. The imaging device according to claim 5, wherein, for imaging units that capture a seam between the combined images closer to a capturing direction of the second imaging unit out of the plurality of imaging units, the control unit controls a difference in exposure levels between the imaging units to be less.

7. The imaging device according to claim 5, wherein, for imaging units that capture a farther direction from a capturing direction of the second imaging unit out of the plurality of imaging units, the control unit controls a difference in exposure levels between the imaging units to be less.

8. The imaging device according to claim 5, wherein the control unit controls a difference in exposure levels between the plurality of imaging units to be less for a smaller change per unit time in a capturing direction of the second imaging unit.

9. The imaging device according to claim 1, wherein the second imaging unit has a zoom mechanism capable of changing a capturing view angle, and
   wherein the control unit acquires the capturing view angle of the second imaging unit as the state of the second imaging unit.

10. The imaging device according to claim 9, wherein the control unit controls a difference in exposure levels between the plurality of imaging units to be less for a wider capturing view angle of the second imaging unit.

11. The imaging device according to claim 9, wherein the control unit controls a difference in exposure levels between the plurality of imaging units to be less for a smaller change per unit time in a capturing view angle of the second imaging unit.

12. The imaging device according to claim 1, wherein the second imaging unit has a focus mechanism capable of changing a focus position, and
    wherein the control unit acquires the focus position as the state of the second imaging unit.

13. The imaging device according to claim 12, wherein the control unit controls a difference in exposure levels between the plurality of imaging units to be less for a smaller change per unit time in a focus position of the second imaging unit.

14. The imaging device according to claim 1, wherein the control unit detects a particular subject in an image captured by the second imaging unit as the information included in an image captured by the second imaging unit.

15. The imaging device according to claim 14, wherein the control unit controls a difference in exposure levels between the plurality of imaging units to be less when the particular subject is not detected in an image captured by the second imaging unit than when the particular subject is detected.

16. The imaging device according to claim 14, wherein the control unit controls a difference in exposure levels between the plurality of imaging units to be less for a smaller size of the particular subject detected in an image captured by the second imaging unit.

17. The imaging device according to claim 1, wherein the control unit adjusts signal levels of the combined image for respective regions of images captured by the plurality of imaging unit after the combining is performed.

18. A system comprising:
    the imaging device according to claim 1; and
    a client device connected to the imaging device via a network.

19. A control method of controlling an imaging device, the control method comprising:
    a first capturing step of acquiring a combined image by a first imaging unit that has a plurality of imaging units arranged such that capturing ranges partially overlap with each other, and that generates the combined image in which images captured by the plurality of imaging units are connected and combined with each other;
    a second capturing step of acquiring an image by a second imaging unit that captures a portion of a capturing range of the first imaging unit; and
    a control step of controlling exposure levels of the plurality of imaging units and determining whether to perform (a) first exposure level control of reducing a difference in signal levels between images captured by the plurality of imaging units, or (b) second exposure level control of improving visibility of brightness of images captured by the plurality of imaging units, based on at least one of a state of the second imaging unit and information included in an image captured by the second imaging unit.

20. A non-transitory storage medium including a program that causes a computer, included in an imaging device that comprises a first imaging unit that has a plurality of imaging units arranged such that capturing ranges partially overlap with each other and that generates a combined image in which images captured by the plurality of imaging units are connected and combined with each other, and a second imaging unit that captures a part of a capturing range of the first imaging unit, to function as the control unit of the imaging device according to claim 1.

21. An imaging device comprising:
a first imaging unit that has a plurality of imaging units arranged such that capturing ranges partially overlap with each other, and that generates a combined image in which images captured by the plurality of imaging units are connected and combined with each other;
a second imaging unit that captures a portion of a capturing range of the first imaging unit; and
a control unit that controls exposure levels of the plurality of imaging units and determines whether to perform (a) first exposure level control of setting substantially the same charge accumulation time of each pixel of image pickup devices of the plurality of imaging units, or (b) second exposure level control of controlling charge accumulation time of each pixel of the image pickup devices such that light measurements acquired by the plurality of imaging units are substantially the same, based on at least one of a state of the second imaging unit and information included in an image captured by the second imaging unit.

22. An imaging device comprising:
a first imaging unit that has a plurality of imaging units arranged such that capturing ranges partially overlap with each other, and that generates a combined image in which images captured by the plurality of imaging units are connected and combined with each other;
a second imaging unit that captures a portion of a capturing range of the first imaging unit; and
a control unit that controls exposure levels of the plurality of imaging units and determines whether to perform (a) first exposure level control of controlling a difference in signal levels between images captured by the plurality of imaging units, or (b) second exposure level control of controlling brightness of images captured by the plurality of imaging units, based on at least one of a state of the second imaging unit and information included in an image captured by the second imaging unit,
wherein the control unit controls a difference in exposure levels between the plurality of imaging units to be less when performing the first exposure level control than when performing the second exposure level control.

* * * * *